(12) United States Patent
Liakis

(10) Patent No.: US 7,469,045 B2
(45) Date of Patent: Dec. 23, 2008

(54) PROCESS FOR PRESENTING A USER STATE USING SEVERAL PIECES OF COMMUNICATION EQUIPMENT

(75) Inventor: Panagiotis Liakis, Paris (FR)

(73) Assignee: Pushmessenger (FR)

( * ) Notice: Subject to any disclaimer, the term of this patent is extended or adjusted under 35 U.S.C. 154(b) by 159 days.

(21) Appl. No.: 11/182,121

(22) Filed: Jul. 15, 2005

(65) Prior Publication Data

US 2006/0034430 A1 Feb. 16, 2006

Related U.S. Application Data

(63) Continuation of application No. PCT/FR2004/000106, filed on Jan. 19, 2004.

(30) Foreign Application Priority Data

Jan. 17, 2004 (FR) .................................. 03 00542

(51) Int. Cl.
*H04M 3/42* (2006.01)
(52) U.S. Cl. ..................... 379/211.04; 379/142.07; 379/204.01; 709/227
(58) Field of Classification Search ............ 379/211.01, 379/142.07, 204.01, 211.04; 370/431; 709/227
See application file for complete search history.

(56) References Cited

U.S. PATENT DOCUMENTS

| 6,449,344 B1 | 9/2002 | Goldfinger et al. |
| 2002/0075306 A1 | 6/2002 | Thompson et al. |
| 2002/0085701 A1* | 7/2002 | Parsons et al. ......... 379/211.01 |
| 2003/0147414 A1* | 8/2003 | Hirata et al. ................ 370/431 |

FOREIGN PATENT DOCUMENTS

EP 1 225 752 A2 7/2002

OTHER PUBLICATIONS

Axel Eschenburg, "Wo laufen sie denn? ICQ halt Vergingung zu Bekannten", CT Magazin Fuer Computer Technik, Verlag Heinz Heise GMBH., Hannover, DE, No. 22, Oct. 26, 1998, pp. 92-95.

* cited by examiner

*Primary Examiner*—Gerald Gauthier
(74) *Attorney, Agent, or Firm*—DLA Piper LLP (US)

(57) ABSTRACT

A process for presenting a state of availability of a user for communications using a plurality of telecommunication devices including at least one means for the production of the presentation associated with an intelligent platform, including acquiring first data composed of characteristics of a user including at least one identification of the user, at least two terminals to which the user can be associated with at least one characteristic of a connection mode and including storage at an address accessible to the intelligent platform of the characteristics, updating second data representative of a physical and/or logic state of a terminal of a user and/or of a general physical and/or logic state of the user with requests for the updating of the physical and/or logic state of an associated terminal and/or of the user by virtue of identification of a user and/or of the user's terminal by a system and/or an authorized user and including optional storage at an address accessible to the intelligent platform of the second data representative of the physical and/or logic state of the terminal or of the physical and/or logic state of the user, and determining the presentation of the first and the second data for a user from the first and the second data which user is registered in the service for presenting the state of a user of the intelligent platform and who made the request.

16 Claims, 1 Drawing Sheet

PROCESS FOR PRESENTING A USER STATE USING SEVERAL PIECES OF COMMUNICATION EQUIPMENT

RELATED APPLICATION

This is a continuation of International Application No. PCT/FR2004/000106, with an international filing date of Jan. 19, 2004 (WO 2004/068809 A1, published Aug. 12, 2004), which is based on French Patent Application No. 03/00542, filed Jan. 17, 2004.

FIELD OF THE INVENTION

This invention relates to user telecommunications and, more particularly, to supplying means to a user using pieces of communication equipment, each of which is suitable for informing other users that subscribed to a service of the availability of the equipment for communications.

BACKGROUND

Numerous situations in the world of telecommunications necessitate the use of one and frequently several user terminals. The latter can be, e.g., a personal computer, a telephone or even a personal assistant. The development of technology has allowed these different terminals to become capable of functioning on mobile or fixed telecommunication networks or even capable of functioning in both these situations. It is known in telecommunication networks that it is possible to communicate with these terminals with identical or different addressing techniques. This fact makes it possible for an application to communicate with all the user terminals on these different fixed or mobile networks with the appropriate communication protocols. The problem posed for the user is that the recipient user of the call can use several terminals and they can be in different physical and logic states (in service or out of service), connected or not connected to communication networks (on-line, off-line) with applications that are active or not active suitable for receiving the communications. Moreover, certain applications offer this user services permitting the user to accept or refuse communications or types of communications and to accept another one of them with the possibility of using the identity of the caller. On the other hand, the receiving user of the call can be temporarily absent and the call can become ineffective or be redirected to auxiliary equipment in the case of absence such as voice mail. This makes it difficult under such conditions for a user desiring to call another user to know what is the probability of an effective call.

A certain number of pieces of equipment have attempted to respond to this problem. They are, e.g., equipment that permits an instant messaging connection. That equipment is connected to a present server that permits identification of the nature and state of the connection with the terminal. One application also permits managing presentation of the states of different terminals that can be used by the user (disconnected, busy, free, unauthorized, sent back . . . ). The standardization organizations are also occupied with the standardization of exchange protocols that permits a client-server relationship to be established in an interoperable manner for communication of connection states and of the states of terminals. Among the latter, at least the following can be cited: the OMA (Open Mobile Allowance) or the IBTF (Internet Forum). The majority of these applications currently proposed permit managing a single terminal visible to the user capable of indicating availability for a communication.

It is clear that this type of process can only be applied to persons managing only a single terminal at a time. In the present world and especially with the appearance of mobile technologies a user will often manage several types of terminals simultaneously. For example, the user could be called for a voice communication by a terminal operating on a network of the public cellular type and simultaneously on a PC connected to a house for an exchange of messages. Identifying the state of the terminals of the correspondent that the user desires to call therefore becomes more complex. The caller then has the possibility of selecting the type of relation that he desires to establish with his correspondent (message or voice, for example).

A supplementary difficulty resides in the fact that the user can not be called on one of these terminals by a single address. Thus, if the user must be called on several terminals, the user must, e.g., be addressed in the following manner: name.forename.PC@domain or also name.forename.portable@domain. The major problem for this type of device stems from the fact that it is not always easy to know beforehand the method for addressing a particular terminal of a user. The instant message servers have found a solution. It consists of having only one user terminal connected at a time to an instant message session and thus to present only this one terminal and its state to the other users. Most of these servers claim the possibility of managing one user and multiple terminals whereas in reality they can not do this in a simultaneous manner. An example is U.S. Pat. No. 6,449,344.

In the solutions of the prior art the state of the user is presented in a unique fashion as a function of the state determined by the user in a non-specific manner for a particular piece of equipment.

For example, US 2002/075306 discloses a suite of collaboration services adapted in such a manner as to take charge of a plurality of integrated telecommunication services to which the members of a geographically dispersed team gain access via a virtual team environment client (VTE) that generates a graphical user interface (GUI) for each member of the team. Communication sessions are installed automatically by the suite of collaboration services in response to request messages via the GUI. The members of the team do not need to know an address for a communication device of another member of the team to start a communication session. That suite of collaboration services comprises a VTE server that communicates with the VTE clients, a presence engine that collects and maintains the status of the communication devices specified in a current profile of the team member and a call server that allows the installation to be controlled and the control of a vocal element for each communication session performed.

In that system, the problem is that if the user declares him/herself to be "available" for a piece of equipment of the personal computer type, the other users will see him/her as "available" in a general fashion for all his/her pieces of equipment of the connected "personal computer" type. In other words, the user will be indicated as "available" for all the connected pieces of equipment.

If the user wishes to declare him/herself "available" for a piece of connected equipment and declare him/herself "unavailable" for another piece of connected equipment, the only solution offered to him/her is to create a second identity for him/herself, the one of which is used for the pieces of equipment for which he/she desires to declare him/herself "available" and the other identity of which is used for the other pieces of connected equipment for which he/she desires to declare him/herself "unavailable".

That system is, of course, neither ergonomic nor technically optimal. The other users have to know several identities for one and the same addressee and select the one identity as a function of the instantaneous state of declaration of the addressee. The user who wants to manage two contexts must manage several open sessions simultaneously, which increases the need for resources for memory, stream and the like.

Moreover, it is necessary that the other users know the list of the pieces of equipment of the user and manage a profile of the user manually, editing the profile of each user and giving information about the physical addresses of each piece of equipment (IP address for the computers, telephone number for the telephonic equipment, etc.).

EP 1225752 discloses a routing system permitting the intelligent routing of instantaneous messages between clients connected to a data network and between representatives of a client service connected to the network. The system comprises at least one instantaneous message server and at least one intermediary server connected to a network and addressable on the network, which intermediary server is capable of realizing the routing to the instantaneous message server and is accessible to the latter. The clients connected to the instantaneous message server via the instantaneous message software exercise a connection link announced by the instantaneous message server to establish bidirectional communication between the client machine and the intermediary server. In a preferred embodiment, the intermediary server interacts with the client in order to identify the client and the client software. The client request is then routed to a representative of the appropriate client service using software compatible with the rules of the company establishing an active instantaneous message connection between the client and the selected client service representative.

That system has the disadvantage of not being able to manage several sessions for one and the same user terminal since the states are proposed only for a specific terminal.

Consequently, no process is entirely satisfactory as concerns the supplying of services to identified persons.

SUMMARY OF THE INVENTION

This invention relates to a process for presenting a state of availability of a user for communications using a plurality of telecommunication devices including at least one means for the production of the presentation associated with an intelligent platform, including acquiring first data composed of characteristics of a user including at least one identification of the user, at least two terminals to which the user can be associated with at least one characteristic of a connection mode and including storage at an address accessible to the intelligent platform of the characteristics, updating second data representative of a physical and/or logic state of a terminal of a user and/or of a general physical and/or logic state of the user with requests for the updating of the physical and/or logic state of an associated terminal and/or of the user by virtue of identification of a user and/or of the user's terminal by a system and/or an authorized user and including optional storage at an address accessible to the intelligent platform of the second data representative of the physical and/or logic state of the terminal or of the physical and/or logic state of the user, and determining the presentation of the first and the second data for a user from the first and the second data which user is registered in the service for presenting the state of a user of the intelligent platform and who made the request.

DETAILED DESCRIPTION

Figure 1:
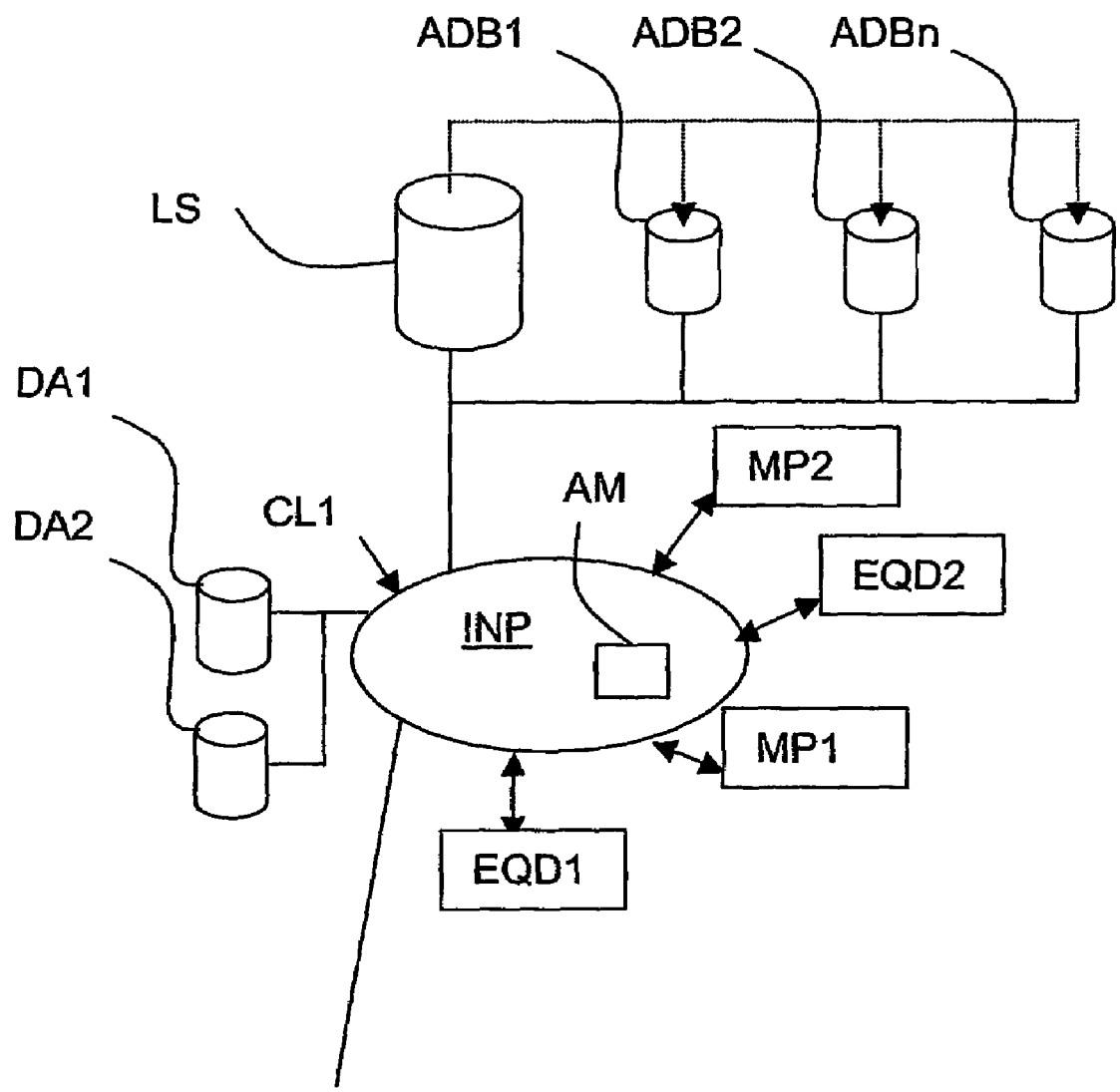
FIG. 1 is a schematic block diagram of a system in accordance with aspects of the invention.

This invention remedies the disadvantages of existing processes aimed at populations using multiple localized terminals in a manner associated with or disassociated with the user and thus rendering the communications more effective. It provides a process for supplying services for pieces of telecommunication equipment permitting presentation of a multitude of terminals for a given user known by a single address such as, e.g., name.forename@domain and providing for each of them the physical and/or logic state of the connection.

More precisely, the process concerns, starting from information supplied by one or several pieces of telecommunication equipment of the user, permitting the functional presentation of their states as a function of rules suitable for the service or for the technical possibilities of the systems. The system advantageously uses a server or a multi-server process that permits association of several terminals with a single user and makes a physical and/or logic state correspond to each of these terminals that represents the availability of the communication on this terminal. The rules for updating this state obey the state of the art and can obey events such as a present or absent telecommunication link, operational or non-operational terminal, the desire of the company to present the availability of this equipment for telecommunications, the desire of the user to present the availability of this equipment for telecommunications, the desire of the user to present the user's mood on the terminal.

The process comprises:
a first stage comprising acquisition of first data composed of characteristics of a user comprising at least one identification of the user, at least two terminals to which the user can be connected with at least one characteristic of the connection mode and comprising storage at an address accessible to an intelligent platform of the characteristics,
a second stage comprising updating second data representative of the state of a user terminal with requests for updating the state of a terminal associated with identification of a user by a system or an authorized user and comprising possible storage at an address accessible to the intelligent platform of the second data representative of the desired state of the terminal, and
a third stage comprising working out and presenting the first and second data for a user from the first and the second data which user is registered in the service for presenting the state of a user of the intelligent platform and who made the request.

The invention is distinguished by the use of all of part of the functionalities of the application by the user equipped with a plurality of pieces of equipment of which certain ones can be of the same nature. For example, the user can have several personal computers: one or several computers at the workplace, one computer in the residence, one portable computer and the like.

These computers are associated with the same logic identifier characterized by an address of the name.forename@domain type.

The invention has the advantage of dynamic means of managing the pieces of equipment and the status of the users.

In particular, the server in accordance with the invention records addresses of each of its pieces of equipment in a dynamic manner during each connection request by a user and for each of the pieces of equipment it records the characteristics of the connection and availability state of the user for the piece of equipment in question. This state can be different for one and the same user for certain pieces of equipment. Another advantageous characteristic of the invention is that to identify the type of equipment the characteristic of its connection means and/or the characteristics of the session associated with the equipment is/are used. Its characteristics can be transmitted or deduced by the software allowing the establishing of the session and/or directly given by the user. Thus, e.g., even though the characteristic of establishing a new session is of the use type of an http protocol indicating in the current state of the art the probable connection of a personal computer from a browser, the user can be incited to characterize the connected equipment more finely by a subtype such as, e.g., a portable computer or even by indicating manually the support of a voice or video type transmission.

In another aspect, the characteristics can be automatically supplied by the software residing on the equipment. The existence of different means of available or unavailable communication means associated with the session, that is, with equipment such as vocal, video, SMS or messaging, transmission can also be established manually and/or automatically. It is thus apparent that more than the simple characteristic of the equipment, namely the characteristic of the session attached to the equipment and opened and managed by the user who is going to be used in the invention that is decisive. Thus, the plurality of sessions opened by the user on similar or different pieces of equipment will permit the user great flexibility in indicating the state of presence and preferences in terms of the choice of communication means.

The user can declare him/herself "available", for a unique identity, for a workplace computer and "unavailable" for a home computer as well as for a telephone.

The other users who recorded the user in question in their list will be able to display in an immediate and global manner the connected pieces of equipment and their specific status as regards the declarations of the user.

This permits a message to be addressed without having to select a user account otherwise different from the preferences. It can also define the ways and means of distribution to different pieces of equipment by managing the characteristics of recording, suppression of the server or of one or of several other pieces of equipment, of non-transmission to other pieces of equipment, and of priority reception.

When the user connects to the server, the user first authenticates him/herself on the server by a method of the login/password type.

The server identifies the user and acquires the characteristics of the connection for creating a session for the user and for the type of equipment from which this session was initialized.

When the session is the first session for the user, the server updates the user table with the one type of terminal as well as the state declared by the user. This information can be viewed by all the other users.

When the session is not the first session, but rather a supplementary session, the server updates the user table with the characteristics of the new session and distributes to the user in question as well as to all the other users the new state of the set of the sessions of the user considered.

Thus, the users see the state of the different sessions associated with the type of connected equipment of a given user dynamically appear as well as the state declared by this user for each of the sessions associated with the connected equipment with the indications of the different communication modes supported by the session.

In other words, the physical connection state and the logic state are distinguished for each user.

The physical state corresponds to the opening of a communication session between the server and a given piece of equipment of the user.

The logic state corresponds for a connected piece of equipment of a given user to the state declared by the latter ("available", "unavailable", "busy" and the like). This logic state can also include the user preferences for the use of communication means that can be initiated by the other users and available on the equipment.

These two combined pieces of information are essential for permitting an effect of communication in conformity with the expectations of the user.

These procedures can be automated or processed manually and can instruct/initiate states by default.

This constitutes an essential difference over the prior art that does not individualize the logic state of a user as a function of different pieces of equipment. Furthermore, the prior art does not dynamically manage opening or closing of new sessions by a given user who has several pieces of equipment.

The process in accordance with the invention can comprise numerous complementary characteristics that can be taken separately and/or in combination, and in particular:

the first and the second data stored in at least one database;

certain second data that can be representative of state can be subdivided. For example, a first level only determines a general level of state whereas the second level permits the determination of the characteristic/nature of the mood associated with the person;

an auxiliary stage comprising regulation of the service by control and execution of the first, second and third stages to determine the necessity of pursuing the requested service.

The invention also relates to a device for correlating between the first data representative of a user and all or part of the states of these terminals and the determination of the state characterized by the user permitting triggering an action changing the general state associated with the appropriate user. Thus, the device permits adaptation of the request made to the intelligent platform with the functionality described in the third stage of the process in a dynamic or pseudo-static manner dependent of the frequency of the supply of external data and/or of correlation rules:

updating means capable of updating the content of the first and of the second data periodically or on request. Such updating means are preferably implanted in a connection server dependent on the intelligent platform; and management means of which at least a part is preferably implanted in a management server of the public network and can comprise storage means comprising the content of the first and of the second data associated with all or part of a characterized state representative of the general state of availability for communications of a user.

The user state can be automated, as well as the selection of the media and of the best media, thus keeping the user from having to manually specify preferences and wishes.

This automation can be performed by rules using exogenous data (hour, time, cost of different communications, day, events and the like) and endogenous data (localization of the user, physical state of his equipment and the like).

Part of the invention can therefore be implemented in every type of communications network, private or public, and in particular in the Internet, PLMN and PSTN networks for, e.g., GSM and UMTS public networks or, e.g., TETRA and/or RUBIS for private networks.

Other characteristics and advantages of the invention will appear from an examination of the following detailed description and from the single drawing attached as FIG. 1 that illustrates in schematic fashion an installation of multi-network equipment and communications equipped with a device in accordance with aspects of the invention.

A device comprising an intelligent platform (INP) ensures supplying services to persons provided with telecommunication equipment suitable for establishing communications of the voice or data type (EQD1, EQD2) with the aid of means for the production of services (MP1, MP2) connected to the intelligent platform (INP).

The intelligent platform (INP) can be connected to a public or private network (PUN1-PUN2, PRN1-PRN2).

The device comprises:
i) at least one database (ADB1, ADB2),
ii) at least one means for producing the presentation of a general state of a user and in particular of associated terminals (MP1, MP2), and
iii) management means (AM) suitable for updating the data of the state of the telecommunication equipment coming at least from one system or upon the request of a user or upon the request of the equipment itself (EQD1, EQD2) and the user data in the database (ADB1, ADB2) in such a manner that the platform (INP) can implement the service requested by user by at least one appropriate means (MP1, MP2). The device can comprise an updating means (LS) of data (ADB1, ADB2) and be connected to the public network (PUN1-PUN2) or private network (PRN1-PRN2) for updating on request or periodically.

The device can also comprise authorization data (DA1, DA2) permitting an appropriate production (MP1, MP2) on local or distant request by virtue of local commands (CL1, CL2) or distant commands routed via the networks (PRN1-PRN2, PUN1-PUN2).

The invention is not limited to the embodiments of processes and devices previously described only by way of example, but rather encompasses all variants that one skilled in the art can envision within the scope of the appended claims.

The solution described can advantageously be expanded in such a manner as to manage notions of ownership and authorization for the data as well as for the means for updating the data and the appropriate productions by virtue of data managed by the INP platform. Thus, the databases can contain on one and the same server data belonging to different companies and the server can permit presentation of the general state of a user and of the particular states of each of his/her terminals to users belonging to different companies to the extent that they have given their authorization.

The invention claimed is:

1. A process for presenting to a requester a state of availability of a user for communications using a plurality of telecommunication devices comprising at least one means for production of the presentation associated with an intelligent platform, comprising:
acquiring first data composed of characteristics of a user comprising i) one identification of the user, ii) at least two terminals to which the user can be associated with at least one characteristic of a connection mode, the identification of the user being the same logic identifier for all of the at least two terminals;
storing at an address accessible to the intelligent platform the first data characteristics;
updating second data representative of a physical and/or logic state of the at least two terminals of the user and/or of a general physical and/or logic state of the user with requests for the updating of the physical and/or logic state of an associated terminal and/or of the user by virtue of identification of the user and/or of the user's terminal by a system and/or an authorized user, the user being simultaneously connected to the intelligent platform by the at least two terminals for providing the second data representative of the at least two terminals;
storing at an address accessible to the intelligent platform of the second data representative of the physical arid/or logic state of the terminal or of the physical and/or logic state of the user;
determining the presentation of the first and the second data for the user from the first and the second data; and
presenting the state of the user of the intelligent platform to a requestor who made the request.

2. The process according to claim 1, wherein the first and the second data are stored in at least one database of the intelligent platform.

3. The process according to claim 1, wherein presentation of the states of a user and of the user's terminals can be associated with generation of a multimedia message.

4. The process according to claim 1, wherein the second data comprises at least one descriptor representative of at least one state comprised in a set composed of connection state, disconnection state, service state, visibility state, availability state, busy state, and state representative of the declared or calculated mood of the person.

5. The process according to claim 1, wherein the second data comprises at least one descriptor representative of a combination of states comprised in the set composed of connection state, disconnection state, service state, visibility state, availability state, busy state, and state representative of the declared or calculated mood of the person.

6. The process according to claim 1, wherein the presentation production means are associated with third data representative of an authorization for access to at least one service for the presentation and/or updating of data available on the intelligent platform.

7. The process according to claim 1, wherein the request for presentation is triggered by a person.

8. The process according to claim 1, performing an auxiliary stage after implementation of the intelligent platform to repeat execution of the acquiring, updating and determining steps to determine a need for pursuing presentation service(s) requested.

9. The process according to claim 1, further comprising a device for correlating between the first data describing the user and associated terminals and between the second data representative of the physical and/or logic state of the terminals or of the user and permitting triggering of the presentation service as a function of rules.

10. The process according to claim 9, wherein the rules are supplied by external data.

11. The process according to claim 9, wherein after the correlating has been performed, the second data. associated with a physical and/or logical state of a terminal or of the user serving for the determining is updated.

12. The process according to claim 1, further comprising updating content of the database periodically or on request.

13. The process according to claim 12, wherein the updating is implanted in a data server with an irregular or permanent connection to the intelligent platform.

14. The process according to claim 12, wherein the intelligent platform and/or the updating is/are implanted in a server for managing a communications network comprising means for storing the content of the database.

15. The process according to claim 14, wherein the communications network is private or public and implements fixed or mobile connections.

16. A process for identifying to a requestor a state of availability of a user for communications using a plurality of telecommunication devices comprising at least one means associated with an intelligent platform, comprising:

acquiring first data composed of characteristics of a user comprising i) one identification of the user, ii) at least two terminals to which the user can be associated with at least one characteristic of a connection therebetween, the identification of the user being the same logic identifier for all of the at least two terminals;

storing at an address accessible to the intelligent platform the first data characteristics;

updating second data representative of a physical and/or logic state of the at least two terminals of the user and/or of general physical and/or logic state of the user with requests for updating of the physical and/or logic state of an associated terminal and/or of the user by virtue of identification of the user and/or of the user's terminal by a system and/or an authorized user, the user being simultaneously connected to the intelligent platform by the at least two terminals for providing the second data representative of the at least two terminals;

storing at an address accessible to the intelligent platform of the second data representative of the physical and/or logic state of the terminal or of the physical and/or logic state of the user;

determining identification of the first and the second data for the user from the first and the second data; and presenting the state of the user of the intelligent platform to a requestor who made the request.

* * * * *